Feb. 2, 1943.  K. F. DOUGLAS  2,310,174
ENGINE STARTER DRIVE
Filed Dec. 6, 1941
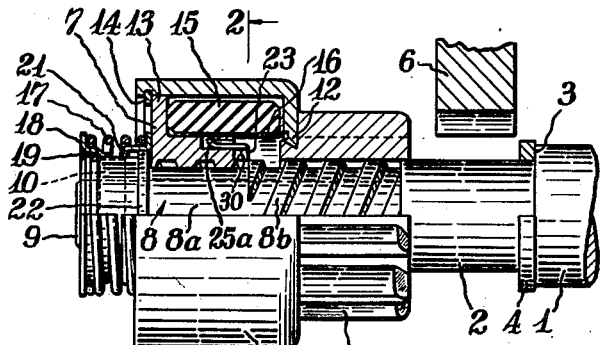
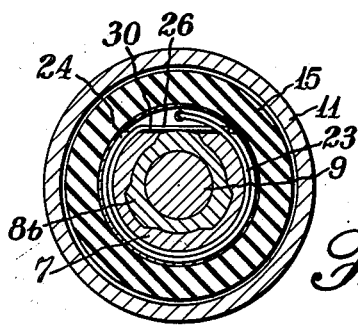
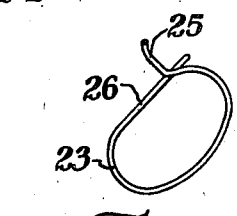
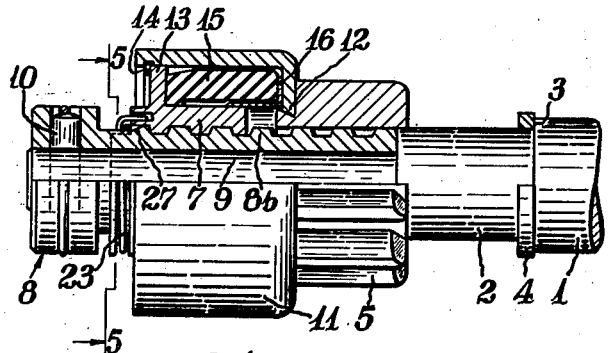
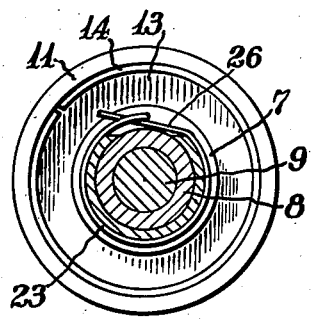
INVENTOR.
Kenneth F. Douglas Patented Feb. 2, 1943

2,310,174

UNITED STATES PATENT OFFICE 2,310,174

ENGINE STARTER DRIVE

Kenneth F. Douglas, Elmira, N. Y., assignor to Bendix Aviation Corporation, South Bend, Ind., a corporation of Delaware Application December 6, 1941, Serial No. 421,947

4 Claims. (Cl. 74—7)

The present invention relates to an engine starter drive and more particularly to starter gearing having provisions for controlling a pinion to prevent its drifting from idle position.

It is an object of the present invention to provide novel anti-drift means for a starter pinion which is efficient and reliable in operation, simple and economical in construction, and readily installed and removed.

It is another object to provide such a device which is arranged to be released by centrifugal force so as not to interfere with the demeshing action of the pinion.

It is a further object to provide such a device incorporating within itself means to limit the effect of centrifugal force on the active portion thereof.

Further objects and advantages will be apparent from the following description taken in connection with the accompanying drawing, in which:

Fig. 1 is a side elevation partly broken away and in section showing a preferred embodiment of the invention;

Fig. 2 is a section taken substantially on the line 2—2 of Fig. 1;

Fig. 3 is a detail in perspective of the anti-drift detent;

Fig. 4 is a view similar to Fig. 1 of a second embodiment of the invention; and

Fig. 5 is a section taken substantially on the line 5—5 of Fig. 4.

In Fig. 1 of the drawing there is illustrated a power shaft 1 having a smooth reduced extension 2 providing a thrust shoulder 3 against which a thrust washer 4 is preferably seated. A pinion 5 is slidably journalled on the portion 2 of the power shaft for movement into and out of engagement with a member such as a gear 6 of an engine to be started.

Means for traversing and rotating the pinion from the power shaft is provided comprising a nut member 7 normally seated on a screw shaft 8 mounted on a further reduced portion 9 of the power shaft and fixed thereon by a pin 10. The screw shaft is provided with a smooth portion 8a on which the nut 7 is normally seated, and a threaded portion 8b, the external diameter of which is the same as the smooth portion 2 of the power shaft. A barrel member 11 is fixed to the pinion 5 in any suitable manner as indicated at 12 and surrounds the nut member 7 bearing on a radial flange 13 of the nut member which is retained in the barrel by means of a lock ring 14. A hollow cylinder 15 of elastically deformable material such as rubber is located in the barrel 11, seated on the nut 7 bearing against the flange 13 and against a thimble 16 which bridges the space between the nut and pinion in order to prevent the member 15 from being pinched therebetween.

A re-entry spring 17 is located on the outer end of the screw shaft 8, bearing against a thimble 18 retained by a lock ring 19, and pressing a second thimble 21 against the nut 7 to urge it into initial engagement with the threads 8b of the screw shaft. The travel of thimble 21 is limited by a flange 22 of the screw shaft so as to define the idle position of the nut.

According to the present invention means are provided for normally maintaining the nut 7 and its associated parts in idle position, such means being shown in the form of a circular loop 23 of elastic wire seated in a groove 24 (Fig. 2) in the end of the nut 7 and having one end 25 anchored to the nut 7 as indicated at 25a. The free end 26 of the detent 23 is flattened and the end of the nut 7 is slabbed off as shown at 30, to permit the end 26 of the detent to bear frictionally on the screw shaft 8. By this arrangement the free end of the detent is movable by centrifugal force out of engagement with the screw shaft when the parts are rotating above a predetermined speed so as then to prevent the detent from functioning. Centrifugal movement of the portion 26 is limited as illustrated by forming said portion to extend beneath the anchored end 25 of the detent whereby distortion of the detent is prevented.

In the embodiment of the invention illustrated in Fig. 4, the parts of the drive are similar to those illustrated in Fig. 1, except that the screw shaft is not provided with a smooth portion for permitting the nut to run off the threads, and the anti-drift detent is located at the rear of the nut 7 instead of in front of the nut. In this embodiment also the screw shaft is provided with an inclined shoulder 27 which is adapted to be engaged by the free end 26 of the detent in order to increase the initial resistance of the detent to traversal of the nut 7.

In both embodiments of the invention the detent 23 is effective to resist traversal of the pinion into undesired engagement of the pinion 5 with the gear 6 when the drive is not in operation. During the cranking operation and thereafter during the demeshing of the pinion, the rotation of the parts maintains the detent inoperative with the free portion 26 thereof bearing against the anchored portion 25 by virtue of centrifugal force.

Although but two embodiments have been shown and described in detail, it will be understood that other embodiments are possible and that changes may be made in the design and arrangement of the parts without departing from the spirit of the invention as defined in the claims appended hereto.

What is claimed is:

1. In an engine starter a power shaft, a pinion journalled thereon for longitudinal movement into and out of engagement with a member of an engine to be started, screw-threaded means for actuating the pinion from the shaft, and means for yieldably holding the pinion in idle position including an annular elastic member anchored to the pinion traversing means and having a portion frictionally connected to the shaft, said portion being movable out of such frictional connection by centrifugal force, and said annular member having provisions to positively limit the centrifugal movement of said portion.

2. In an engine starter a power shaft, a pinion journalled thereon for longitudinal movement into and out of engagement with a member of an engine to be started, screw-threaded means for actuating the pinion from the shaft, and means for yieldably holding the pinion in idle position including a circular loop of elastic wire having one end anchored to the pinion traversing means and the free end bearing frictionally on the shaft, the free end being movable by centrifugal force out of engagement with the shaft, the anchored end of the loop being arranged to engage and limit the centrifugal movement of the free end.

3. In an engine starter a power shaft, a pinion journalled thereon for longitudinal movement into and out of engagement with a member of an engine to be started, screw-threaded means for actuating the pinion from the shaft including a screw shaft fixed to the power shaft and a nut connected to the pinion, anti-drift means for the pinion including an inclined shoulder on the screw shaft, a spring wire loop anchored at one end to the nut and having a portion adjacent the free end adapted to frictionally engage said shoulder, said anchored end of the loop being arranged to engage and limit the expansion of the free end of the loop.

4. An anti-drift spring for a starter drive comprising a loop of spring wire having an anchoring projection formed on one end, a flattened portion adjacent the other end, said loop being expansive responsive to centrifugal force, and said projection being arranged to engage the flattened portion to limit the expansion of the loop.

KENNETH F. DOUGLAS.